United States Patent [19]

Dittrich et al.

[11] Patent Number: 5,127,960
[45] Date of Patent: Jul. 7, 1992

[54] METHOD FOR REMOVING WASHCOAT REMAINING IN THE CHANNELS OF FRESHLY COATED MONOLITHIC OR HONEYCOMBED CATALYST CARRIERS

[75] Inventors: Ewald Dittrich, Grosskrotzenburg; Reinhard Manner, Maintal-Doernigheim; Gerhard Birtigh, Nidderau; Felix Schmidt, Rheinfelden, all of Fed. Rep. of Germany

[73] Assignee: Degussa AG, Frankfurt am Main, Fed. Rep. of Germany

[21] Appl. No.: 738,434

[22] Filed: Jul. 31, 1991

Related U.S. Application Data

[62] Division of Ser. No. 305,396, Feb. 2, 1989, Pat. No. 5,070,893.

[30] Foreign Application Priority Data

Jun. 2, 1988 [DE] Fed. Rep. of Germany ....... 3803579

[51] Int. Cl.$^5$ ............................ B08B 5/04; B08B 9/00; B05D 3/00; B05D 3/12
[52] U.S. Cl. ..................................... 134/21; 134/22.1; 134/22.11; 134/22.12; 427/350; 427/294
[58] Field of Search ................... 134/21, 22.1, 22.11, 134/22.12; 427/350, 294

[56] References Cited

U.S. PATENT DOCUMENTS

| | | | |
|---|---|---|---|
| 4,039,482 | 8/1977 | Hoyer et al. | 427/294 |
| 4,191,126 | 3/1980 | Reed et al. | 427/350 |
| 4,208,454 | 6/1980 | Reed et al. | 427/243 |

*Primary Examiner*—Theodore Morris
*Assistant Examiner*—Zeinab El-Arini
*Attorney, Agent, or Firm*—Beveridge, DeGrandi & Weilacher

[57] ABSTRACT

An apparatus and a method are disclosed for the removal and the recovery of washcoat remaining in the channels of freshly coated monolithic or honeycombed catalytic carriers. The carrier is inserted into a chamber from above and tightly fitted therein at least with the lowest part of the carrier therein. The chamber is fitted with a collection area and a runoff located thereunder. The runoff leads via a shutoff valve into a separation vessel under a vacuum. The opening and closing of the shutoff valve causes air to be aspirated through the carrier channels, which are open at the top or are gradually opened by means of a slotted slide. This action causes the washcoat remnants to be transferred into the separation vessel, where they can be collected in the sump and are then pumped off. The apparatus can be used in systems for manufacturing catalysts for cleaning exhaust gases.

18 Claims, 2 Drawing Sheets

METHOD FOR REMOVING WASHCOAT REMAINING IN THE CHANNELS OF FRESHLY COATED MONOLITHIC OR HONEYCOMBED CATALYST CARRIERS

This is a divisional of co-pending application Ser. No. 07/305,396 filed on Feb. 2, 1989, now U.S. Pat. No. 5,070,893.

INTRODUCTION AND BACKGROUND

The present invention relates to an apparatus and a method for removing washcoat remaining in the channels of freshly coated monolithic or honeycombed catalytic carriers and the use of the apparatus in the production of catalysts having those carriers.

Monolithic or honeycombed substrates used for the preparation of exhaust gas purification catalysts are well known and can be made of ceramic or metal. Any such substrates can be treated in accordance with the herein described invention.

During the manufacture of monolithic or honeycombed catalysts, e.g. for the cleaning of automobile or industrial exhaust gases, the catalysts are usually coated with a film of a high surface-area, finely divided and porous ceramic metal oxide such as $\gamma$-$Al_2O_3$ for increasing the carrier surface. This coating deposited on the substrate is referred to in the industry as a "washcoat". This coating operation is usually performed by spraying or by an immersion method using a suspension of the metal oxide. An important phase of the manufacturing operation resides in the removal of the nonabsorbed washcoat remaining in the channels of the freshly coated, monolithic or honeycombed catalyst carriers. The channels cannot be clogged with excess washcoat as it will interfere with the stream of exhaust gas which passes through such devices in actual installations. Up to the present time, this removal step was carried out by blowing out the excess washcoat with compressed air, that is, the excess washcoat was removed and blown away from the solid body by means of an impulse or jet of an applied stream of air. This causes fine suspension particles in droplet form to be produced; i.e. an aerosol effect.

These particles can not be completely caught in storage tanks or the like with reasonable technical expense and effort so that in the course of the operating time not inconsiderable contaminations of the system occur as a result of being coated with dried washcoat. This can progress to such an extent that the mechanical functioning of the components of the system is adversely affected. This problem can be counteracted only with a considerable and periodic cleaning effort. In addition, especially finely atomized washcoat can result in the formation of an aerosol and adversely affect the surrounding. This must be counteracted by the installation of specially adapted exhaust devices.

As a result of these recognized problems in the industry, there was an urgent need for an improved method of operation which could also be automated.

SUMMARY OF THE INVENTION

An object of the invention is to provide an apparatus for removing and recovering washcoat remaining in the channels of freshly coated, monolithic or honeycombed catalyst carriers. The apparatus features a chamber which surrounds at least the lower outer surface or exterior jacket of the carrier in sealing engagement and forms a collection zone space with a drain runoff located under the carrier. The chamber for containment of the carrier device can also extend upwardly to completely surround the carrier except for the top or upper frontal surface of the carrier. Optionally, a plate is positioned to rest in a sealing manner directly on the upper front surface of the carrier positioned in the chamber. Alternatively, the plate rests on the chamber wall top edge projecting just above the top front surface of the carrier. The plate can be moved in sliding manner over the top of the carrier located in the chamber. The moveable plate is provided with one or several ventilation slots which are capable of successively being in open relation with all channels of the carrier. Connected by a pipeline to the collection chamber is a separation vessel for the separation and removal of washcoat. The upper portion of the separation vessel is connected to a pipeline from the drain of the collection zone for conducting the washcoat and air. This pipeline is also provided with a suction valve. The upper portion of the separation vessel is also connected to an exhaust-air line which in turn is connected to an induced-draught blower. In the bottom of the separation vessel, there is a drain which communicates with a liquid pump for removal of the separated liquid excess washcoat.

A sealing sleeve formed of an elastic, inflatable hollow body can be used for the seal between the carrier outer jacket surface and the collection chamber wall. Compressed air is used to pump up the sealing sleeve to form the airtight seal.

The apparatus can be operated with a carrier in position where the front surface, which is oriented towards the top of the apparatus remains constantly open. However, it is also possible and advantageous as regards the uniformity of the removal of the washcoat to operate the apparatus with the retaining chamber extending its vertical side walls upwardly with its upper top edge just slightly above the upper surface of the carrier positioned in the chamber. The chamber can be of any convenient configuration; e.g. round or square. The said chamber makes it possible, when used in conjunction with a slotted plate covering it, to separately freely expose at a time one section, of the front carrier surface formed of one or more channels of excess washcoat. This can be done in a sequential manner, one section after the other.

The previously unavoidable contamination of the environment with blown-out washcoat spray can be reliably avoided by means of the spatially enclosed connection between carrier containment chamber and the separating or removal vessel. The apparatus can take the form of various embodiments.

In an embodiment where a movable plate is used, it can be arranged so that it can be moved linearly across the top surface of the carrier, in which case the ventilation slot in the plate is vertically oriented to the direction of plate motion and thus lines up in length according to the largest diameter of the carrier.

The ability of the movable plate to shift linearly and perpendicularly with respect to the channels in the carrier can be assured by a slotted plate which is pressed against the upper edge of the chamber and is connected by a pressure-spring means to moveable means such as a truck or sliding carriage which runs on both sides of the chamber and on rails located above the chamber.

It is also possible to design and mount a slotted plate as a rotary slide, in which instance the slot length corresponds to the greatest radius of the carrier. Each ventilation slot in the plate can be at least as wide as the greatest inside diameter of a monolithic channel.

It is preferable, if several slots are present, that they are arranged parallel to each other.

No limitations are placed on the shape of the separation vessel. However, the use of a cyclone as separation vessel for the separation or removal of excess washcoat product is provided herewith as an advantageous variant of the invention.

A further object of the invention is to provide a method for removing and recovering washcoat remaining in the channels of freshly coated, monolithic or honeycombed catalytic carriers, especially with the use of the above described apparatus. The method is characterized in that the catalytic carrier is inserted into the excess washcoat collection chamber in sealing engagement with the walls of said chamber. The shutoff valve is closed and then the suction-removal valve is opened at least once. A slotted plate is optionally moved over the upper front surface of the carrier. Air is removed by suction in a continuous manner from the washcoat/air mixture transferred from the collection chamber into the separation or removal vessel. The liquid phase which collects in the separation vessel as a result thereof is pumped off either continuously or in an alternating manner.

Still further, an object of the invention resides in the use of the described apparatus in a system for manufacturing monolithic or honeycombed catalysts for cleaning exhaust gas.

BRIEF DESCRIPTION OF THE DRAWINGS

The invention will be further understood with reference to the drawings wherein.

DETAILED DESCRIPTION OF THE INVENTION

Figure 1:
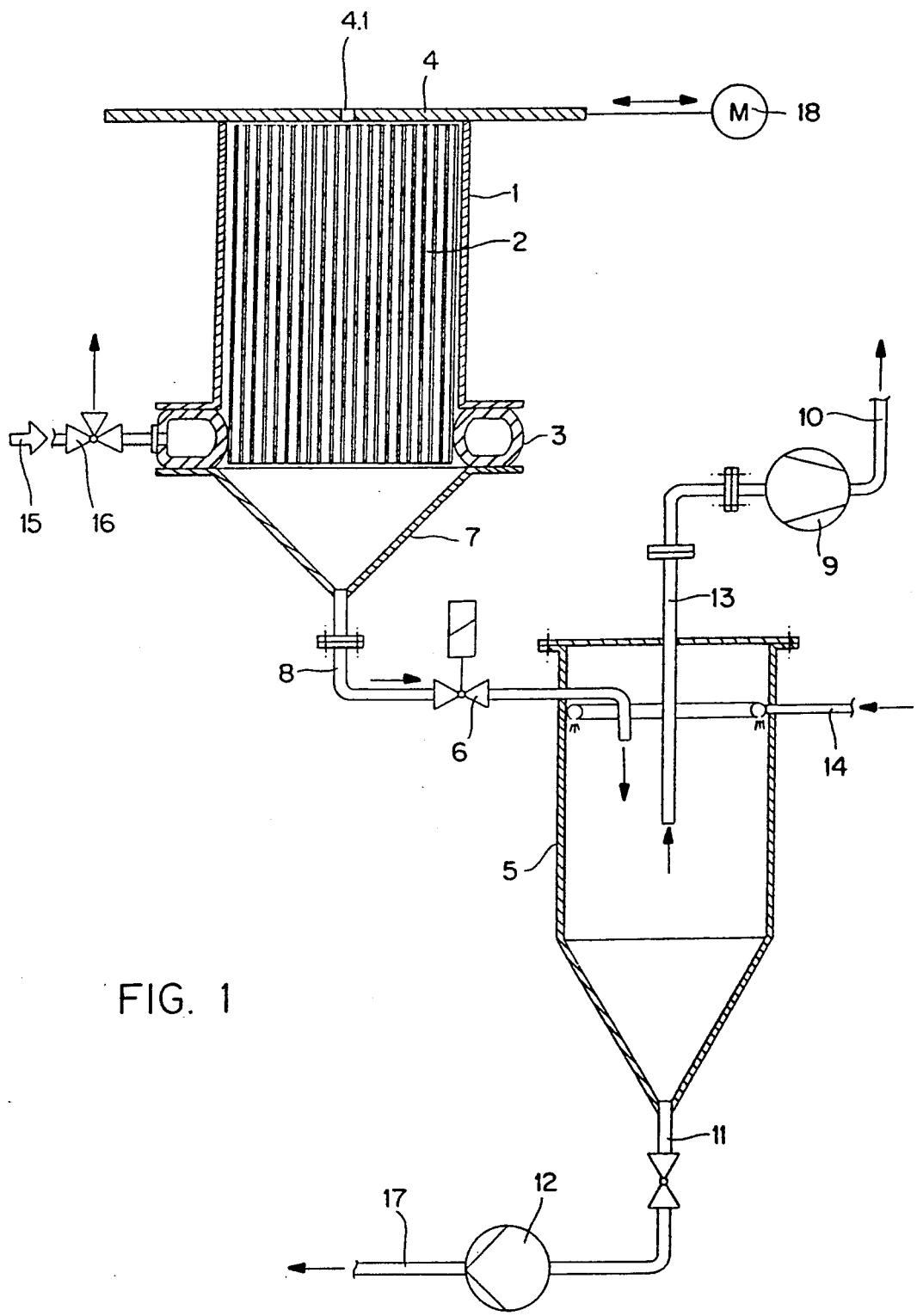
FIG. 1 shows a schematic representation of an advantageous embodiment of the apparatus fitted with a movable slotted plate.

According to FIG. 1, the apparatus of the invention includes a carrier containment collection chamber 1 which receives carrier 2 and seals it off at least at the lower end thereof with inflatable sealing sleeve 3. The flat movable slotted plate 4 rests on the edge of collection chamber 1. As shown, the height of the vertical chamber wall is only slightly higher than the height of the monolithic carrier and thereby forms a slight space between the plate and the front surface of the carrier (play of <1 mm). However, in an alternate embodiment, the chamber may hold or retain the carrier at the lower end of the carrier only.

The separation vessel 5 for the separation of the washcoat/air mixture is connected in series to collection chamber 1. Runoff area 7 located below the chamber 1 functions to collect the excess washcoat suspension and communicates with pipeline 8. The latter communicates with suction removal valve 6. A line runs from the latter to separation vessel 5.

The sleeve 3 is made of any suitable elastic material that can be inflated using a source of compressed air. It functions to form a seal between the chamber walls and the runoff area (7). As the sleeve inflates, it forms a tight seal with lower edge of the chamber wall and the runoff area (7).

Vacuum generator 9 conveys the exhaust air via lines 13 and 10 to the surroundings. Water is sprayed into the separation vessel via line 14. The supply of compressed air 15 effects the seal between sleeve 3 and carrier 2 and is controlled by valve 16. The washcoat suspension passes via drain runoff line 11 designed as a nozzle with stirrer means and via pump 12 to further processing 17.

The operation of the apparatus of the invention is as follows:

The monolithic or honeycombed carrier 2 is placed in the open or opened holding chamber 1. The insertion takes place with suction-removal valve 6 closed. Then, valve 16 is opened for supplying compressed air 15 for sealing the carrier jacket in relation to chamber 1 by means of sealing sleeve 3 consisting of an elastic material. At the same time, vacuum generator 9 creates a vacuum in separation vessel 5 via induced draught 13.

A vacuum is produced in carrier interior 2 and in the channels thereof by a single or multiple openings, e.g. pulsating, of valve 6. As a result excess washcoat suspension and air are collected in the washcoat suspension runoff area 7 and conveyed by pipeline 8 to separation vessel 5. The air is continuously removed by suction from separation vessel 5 via line 13, pump 9, and line 10. The accumulating liquid phase is constantly or alternatingly pumped off via pipeline 11 and pump 12, then supplied to further processing in line 17. The spraying in of water in conduit 14 assures a suitable regulation of the viscosity of the suspension to be pumped off.

After valve 6 has been opened, slotted plate 4 is moved by motor drive 18 linearly over the front carrier surface at a close interval. Slot width and motion speed can be variably dimensioned.

Figure 2:
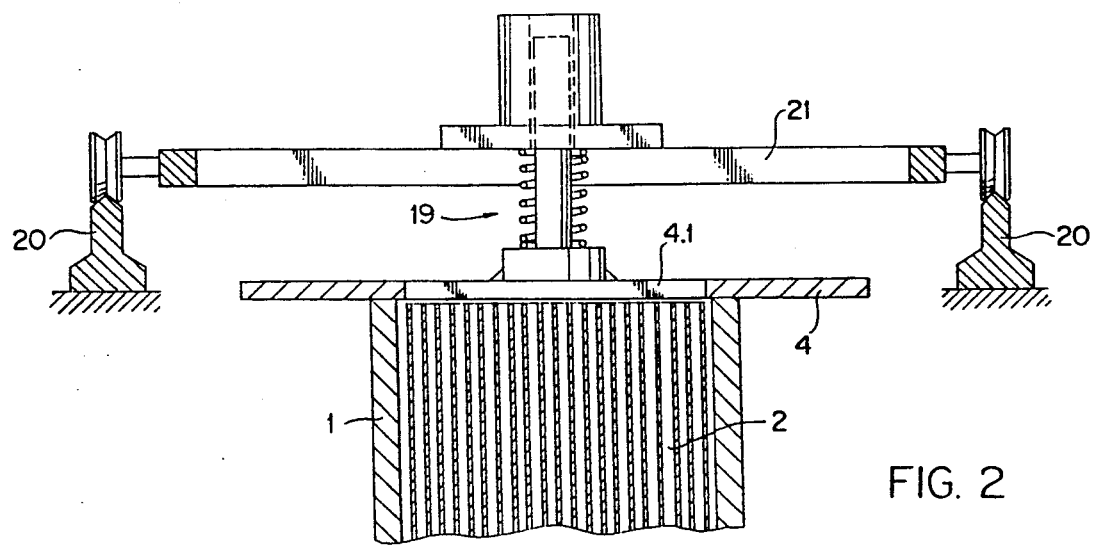
FIG. 2 shows a detail of the upper section of the monolithic insertion chamber of FIG. 1 with the structure for moving the plate located above.

FIG. 2 shows a slotted plate 4 which is pressed against the upper edge of the holding chamber 1 and is connected via pressure-spring arrangement 19 to truck 21 which runs on rails 20 located on both sides of chamber 1 and above the latter.

Figure 3:
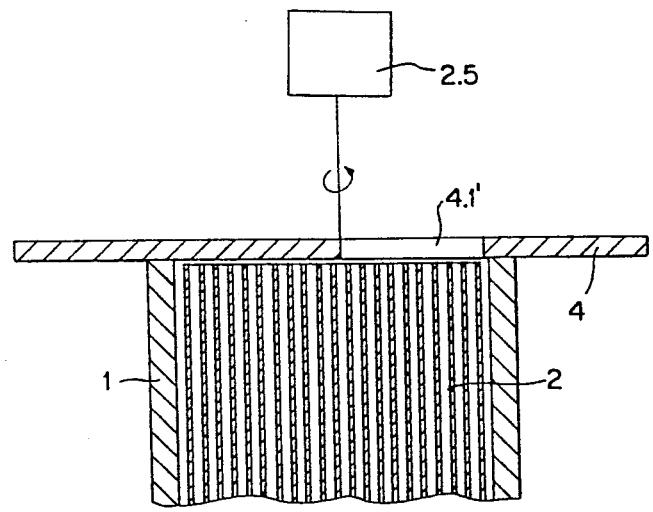
FIG. 3 shows another embodiment of the invention featuring a rotary sliding plate and schematically illustrated rotary sliding means.

FIG. 3 shows a cut away cross-sectional view of another embodiment of the invention wherein rotary sliding means 25 rotates plate 4 with ventilation slot 4.1 extending for the radius of carrier 2.

Figure 4:
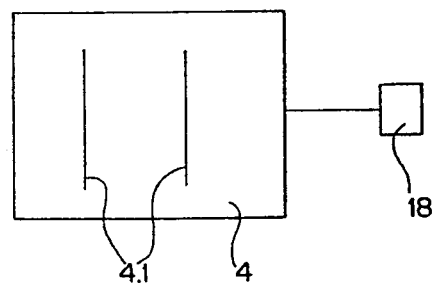
FIG. 4 shows in schematic fashion a sliding plate with multiple ventilation slots.

FIG. 4 shows schematically the previously described embodiment of the present invention which features a plurality of ventilation slots 4.1 formed in plate 4.

Further variations and modifications of the invention will be apparent to those skilled in the art from the foregoing and are intended to be encompassed by the claims appended hereto.

German priority application P 38 03 579.0-43 is relied on and incorporated herein by reference.

We claim:

1. A method for the removal and recovery of washcoat remaining in the channels of freshly coated monolithic or honeycombed catalytic carriers, comprising inserting a monolithic catalytic carrier of predetermined height and diameter and having a plurality of channels formed therein into a chamber (1) having upstanding walls corresponding in height to at least part of the height of said monolithic carrier, said chamber having a lower portion for collection of excess washcoat and being fitted to a conduit (8) connected to a suction valve (6), said suction valve (6) being positioned upstream of separation means (5) and being closed until after the carrier is positioned in said chamber, forming a seal against entry of air between the chamber and the carrier, producing a vacuum downstream of said suction valve and then opening and closing said suction valve (6) while the vacuum is being produced so as to convey excess washcoat and air through conduit (8) and to separation means (5), removing air by suction from the washcoat/air mixture conveyed into said separation means (5) and collecting liquid phase.

2. The method according to claim 1 wherein a slotted plate (4) is moved over the upper front surface of the carrier.

3. A method for the removal and recovery of washcoat remaining in the channels of freshly coated monolithic or honeycombed catalytic carriers, comprising the step of:

positioning the catalytic carrier on a support which includes a runoff conduit positioned below a lower end of the catalytic carrier;

forming a seal between a sealing member and the catalytic carrier;

laterally sliding a sliding member that is positioned on or above an upper end of the carrier and which includes an elongated slot;

directing gas through said slot while said sliding member is laterally sliding and into underlying channels of the catalytic carrier, and said step of laterally sliding said sliding member including passing said slot in sequence over all of the underlying channels of the catalytic carrier such that excess washcoat in any of the channels passes out of the catalytic carrier and into said runoff conduit.

4. A method as recited in claim 3 wherein said sliding member is a plate with an elongated slot, and said step of laterally sliding a sliding member includes sliding said sliding member while said sliding member is resting on an upper surface of the catalytic carrier.

5. A method as recited in claim 3 further comprising the step of separating gas and washcoat from a mixture of gas and washcoat that has passed through said runoff conduit and into a separation vessel by simultaneously creating a suction effect and injecting a liquid spray in the separation vessel.

6. A method as defined in claim 3 wherein said catalytic carrier has an exterior side surface extending between the upper and lower ends of the catalytic carrier and said step of positioning the catalytic carrier on a support includes placing the catalytic carrier in a chamber that completely surrounds the entire exterior side surface of the catalytic carrier.

7. A method as recited in claim 6 wherein said step of laterally sliding a sliding member includes sliding said sliding member while said sliding member is supported by an open upper edge of said chamber.

8. A method as recited in claim 7 wherein said step of positioning said catalytic carrier on a support includes placing said carrier in said chamber such that the open upper edge of the chamber is above the upper end of the catalytic carrier and a space is provided between said sliding member sliding on the open upper edge and the upper end of the catalytic carrier.

9. A method as recited in claim 3 wherein said step of forming a sealing between the catalytic carrier and the sealing member includes inflating an elastic member of said sealing member such that said sealing member compresses against and surrounds an exterior surface of the catalytic carrier.

10. A method for the removal and recovery of washcoat remaining in the channels of freshly coated monolithic or honeycombed catalytic carriers, comprising the steps of:

positioning the catalytic carrier on a support which includes a runoff conduit positioned below a lower end of the catalytic carrier;

rotating a rotating member with respect to the upper end of the carrier, said rotating member having an elongated slot and being positioned on or above an upper end of the carrier;

directing gas through said slot while said rotating member is being rotated, and said step of rotating said rotating member includes passing said elongated slot in sequence over all of the underlying channels of the catalytic carrier such that excess washcoat in any of the channels passes out of the catalytic carrier and into said runoff conduit.

11. A method as recited in claim 10 further comprising the step of separating gas and washcoat from a mixture of gas and washcoat that has passed through said runoff conduit and into a separation vessel by simultaneously creating a suction effect and injecting a liquid spray in the separation vessel.

12. A method as recited in claim 12 wherein said carrier includes an exterior side surface extending between the upper and lower end of said catalytic carrier and said step of positioning the catalytic carrier includes placing the catalytic carrier in a chamber which completely surrounds the entire side surface of the catalytic carrier.

13. A method as recited in claim 12 wherein said step of rotating said rotating member includes rotating said rotating member while said rotating member is supported by an open upper edge of said chamber.

14. A method as recited in claim 13 wherein the step of positioning said catalytic carrier includes placing said carrier in said chamber such that the open upper edge of said chamber is above the upper end of the catalytic carrier and a space is provided between said rotating member rotating on the open upper edge and the upper end of the catalytic carrier.

15. A method as recited in claim 10 wherein said step of forming a seal between the catalytic carrier and the sealing member includes inflating an elastic member of said sealing member such that said sealing member compresses against and surrounds an exterior surface of the catalytic carrier.

16. A method as recited in claim 3, wherein said step of directing gas through said slot includes drawing gas with a vacuum pump positioned downstream of said runoff conduit and opening and closing a suction valve positioned downstream of said runoff conduit and upstream of said vacuum pump while said vacuum pump is operating.

17. A method as recited in claim 10, wherein said step of directing gas through said slot includes drawing gas with a vacuum pump positioned downstream of said runoff conduit and opening and closing a suction valve positioned downstream of said runoff conduit and upstream of said vacuum pump while said vacuum pump is operating.

18. The method according to claim 1, wherein said suction valve is opened and closed in pulsating fashion while a vacuum is being produced downstream of said suction valve.

* * * * *